US009906298B2

(12) United States Patent
Togashi

(10) Patent No.: US 9,906,298 B2
(45) Date of Patent: *Feb. 27, 2018

(54) VISIBLE LIGHT TRANSMITTER, VISIBLE LIGHT RECEIVER, VISIBLE LIGHT COMMUNICATION SYSTEM, AND VISIBLE LIGHT COMMUNICATION METHOD

(71) Applicant: Samsung Electronics Co., Ltd., Gyeonggi-do (KR)

(72) Inventor: Mitsuhiro Togashi, Kanagawa (JP)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,676

(22) Filed: Jan. 5, 2016

(65) Prior Publication Data

US 2016/0248504 A1 Aug. 25, 2016

Related U.S. Application Data

(63) Continuation of application No. 12/450,592, filed as application No. PCT/JP2007/074907 on Dec. 26, 2007, now Pat. No. 9,232,202.

(30) Foreign Application Priority Data

Mar. 30, 2007 (JP) ................... 2007-091744

(51) Int. Cl.
*H04B 10/116* (2013.01)
*H04N 7/22* (2006.01)
(Continued)

(52) U.S. Cl.
CPC ............. *H04B 10/116* (2013.01); *H04N 7/22* (2013.01); *H04N 9/64* (2013.01); *H04N 11/04* (2013.01)

(58) Field of Classification Search
CPC .................................................. H04B 10/116
See application file for complete search history.

(56) References Cited

U.S. PATENT DOCUMENTS

| | | | |
|---|---|---|---|
| 6,201,822 B1 | 3/2001 | Okayasu | |
| 7,173,551 B2 | 2/2007 | Vrazel et al. | |

(Continued)

FOREIGN PATENT DOCUMENTS

| | | | |
|---|---|---|---|
| CN | 1933369 | | 3/2007 |
| JP | 6153280 A | | 5/1994 |

(Continued)

OTHER PUBLICATIONS

International Search Report dated Mar. 4, 2008 in connection with PCT Patent Application No. PCT/JP2007/074907.

(Continued)

*Primary Examiner* — Shi K Li

(57) ABSTRACT

A visible light communication system having a transmission apparatus for modulating a transmission signal to a multiple-value number and a reception apparatus for demodulating a multiple-value modulated transmission signal is provided. The transmission apparatus includes a plurality of light emitters for emitting light in different colors, a chromaticity coordinates calculator for mapping a digital value to a chromaticity coordinates value, and a light intensity controller for controlling a light intensity of each of the light emitters based on the chromaticity coordinates value corresponding to the digital value. The reception apparatus includes a plurality of light receivers having different spectral characteristics, a chromaticity coordinates calculator for calculating a chromaticity coordinates value according to a received light intensity detected by each of the light receivers, and a demodulator for demodulating the digital value from the chromaticity coordinates value.

18 Claims, 5 Drawing Sheets

(51) Int. Cl.
*H04N 9/64* (2006.01)
*H04N 11/04* (2006.01)

(56) References Cited

U.S. PATENT DOCUMENTS

| | | |
|---|---|---|
| 7,689,130 B2 | 3/2010 | Ashdown |
| 7,778,548 B2 | 8/2010 | Yamamoto |
| 8,254,791 B2 * | 8/2012 | Irie .................... H04B 10/1143 398/172 |
| 2002/0196510 A1 | 12/2002 | Hietala et al. |
| 2004/0207926 A1 | 10/2004 | Buckman et al. |
| 2006/0092444 A1 | 5/2006 | Nakamura et al. |
| 2006/0193634 A1 * | 8/2006 | Wang ................ H04B 10/1141 398/118 |
| 2006/0239689 A1 | 10/2006 | Ashdown |
| 2007/0058987 A1 | 3/2007 | Suzuki |
| 2007/0086792 A1 | 4/2007 | Regev |

FOREIGN PATENT DOCUMENTS

| | | |
|---|---|---|
| JP | 09-051548 | 2/1997 |
| JP | 09-311641 | 12/1997 |
| JP | 2001-189660 | 7/2001 |
| JP | 2003 318836 A | 11/2003 |
| JP | 2004193908 A | 7/2004 |
| JP | 2005-528733 | 9/2005 |
| JP | 2006-129263 | 5/2006 |
| JP | 2006-270135 | 10/2006 |
| JP | 2007-013485 | 1/2007 |
| JP | 2007-259111 | 10/2007 |
| WO | WO 03/055273 A2 | 7/2003 |
| WO | WO 2006/033263 * | 3/2006 ......... H04B 10/1143 |

OTHER PUBLICATIONS

Korean Office Action dated Oct. 31, 2013 in connection with Korean Patent Application No. 10-2009-7020581; 8 pages.
"Digital Image Processing: PIKS Inside"; Third Edition by William K. Pratt; John Wiley & Sons, Inc. 2001; pp. 709-713.
"Linear Algebra" by Jim Hefferon; 2001, downloaded from http://www.math.niu.edu/-beachy/courses/423/ hefferon_anskey.pdf; pp. 1-209.
"Digital Image Processing: PIKS Inside"; Third Edition by William K. Pratt; John Wiley & Sons, Inc. 2001.
Foreign Communication from Related Counterpart Application; Chinese Patent Application No. 201610183151.4; First Chinese Office Action dated Aug. 28, 2017; 24 pages.

* cited by examiner

VISIBLE LIGHT TRANSMITTER, VISIBLE LIGHT RECEIVER, VISIBLE LIGHT COMMUNICATION SYSTEM, AND VISIBLE LIGHT COMMUNICATION METHOD

CROSS-REFERENCE TO RELATED APPLICATIONS AND CLAIM OF PRIORITY

The present application is a continuation of U.S. patent application No. 12/450,592, filed on Sep. 30, 2009, which claims priority under 35 U.S.C. § 365 to International Patent Application No. PCT/JP2007/074907 filed Dec. 26, 2007, entitled "VISIBLE LIGHT TRANSMITTER, VISIBLE LIGHT RECEIVER, VISIBLE LIGHT COMMUNICTAION SYSTEM, AND VISIBLE LIGHT COMMUNICATION METHOD". International Patent Application No. PCT/JP2007/074907 claims priority under 35 U.S.C. § 365 and/or 35 U.S.C. § 119(a) to Japanese Patent Application No. 2007-091744 filed Mar. 30, 2007 and which are incorporated herein by reference into the present disclosure as if fully set forth herein.

TECHNICAL FIELD

The present invention relates to a visible light transmission apparatus, a visible light reception apparatus, a visible light communication system, and a visible light communication method.

BACKGROUND ART

Optical communication technologies using light of a visible light range have recently been attracting much interest. Along with the rapid proliferation of lighting devices using light emitting devices such as Light Emitting Diodes (LEDs) or the like, techniques for realizing more convenient, higher-rate data communication using infrastructures including indoor and outdoor lightings are under development.

Although LEDs are most promising for light emission in high-speed optical data transmission in terms of influence on the human body and medical equipment, other semiconductor light emitting devices are also available, inclusive of Laser Diodes (LDs) or Super Luminescent Diodes (SLDs) that offer a faster response performance. Also, data rate is dependent on the response speed of a light emitting device in optical communication. In this context, a technique for transmitting a large amount of data stably in one signal of light emission of a light emitting device is needed.

In relation to the above problem, for example, Japanese Laid-Open Patent Application Publication No. 2004-147063 (Patent Document 1) discloses a structure for adjusting a control voltage to change the intensity of light emitted from a light source according to a frequency-multiplexed signal. With the use of this structure, it is possible to change the light intensity of a light source or transmit multiplexed data under on/off control. Compared to non-multiplexing, a higher data rate can be achieved. Japanese Laid-Open Patent Application Publication No. 2006-325085 (Patent Document 2) discloses a structure for transmitting different data by controlling light emission of a plurality of light sources having different spectrums. To be more specific, Patent Document 2 discloses a structure for transmitting data by mapping digital values (1, 0) to phase changes at a transition timing of a Pulse Width Modulation (PWM) signal.

DISCLOSURE

Technical Problem

However, the transmission technique of Patent Document 1 increases a transmission error rate due to a decrease in light intensity on a transmission path because multiplexed data is transmitted by modulating a light intensity. Especially in visible light communication, if a light source as a transmission apparatus is a lighting device, its light intensity is decreased due to effects of shielding. Consequently, an increased transmission error rate decreases a data rate. Even though the transmission technique of Patent Document 1 is implemented, it is not easy to increase a data rate up to the response limit of the light source.

Meanwhile, no more than a few-fold increase in data rate is expected from the transmission technique of Patent Document 2 because the multiplicity of data is equal to or less than the number of light sources having different emission spectrums. Moreover, the multiplicity is further decreased, except when a light source emits white light.

The present invention is intended to address the above problems. Accordingly, an object of the present invention is to provide a visible light transmission apparatus, a visible light reception apparatus, a visible light communication system, and a visible light communication method, for enabling transmission of data modulated to a multiple-value number including as many values as or values more than number of light sources and at the same time, suppressing an increase in a transmission error rate, caused by a decrease in light intensity on a transmission path.

Technical Solution

To achieve the above object, in one aspect of the present invention, there is provided a visible light communication system comprising a transmission apparatus and a reception apparatus that conduct visible light communication. The transmission apparatus includes a plurality of light emitters for emitting light in different colors, a chromaticity coordinates calculator for mapping a digital value to a chromaticity coordinates value, and a light intensity controller for controlling a light intensity of each of the light emitters based on the chromaticity coordinates value corresponding to the digital value. The reception apparatus includes a plurality of light receivers having different spectral characteristics, a chromaticity coordinates calculator for calculating a chromaticity coordinates value according to a received light intensity detected by each of the light receivers, and a demodulator for demodulating the digital value from the chromaticity coordinates value.

In another aspect of the present invention, there is provided a visible light transmission apparatus including a plurality of light emitters for emitting light in different colors, a chromaticity coordinates calculator for mapping a digital value to a chromaticity coordinates value, and a light intensity controller for controlling a light intensity of each of the light emitters based on the chromaticity coordinates value corresponding to the digital value The plurality of light emitters may be grouped into a plurality of light emitter groups each group having a plurality of light emitters.

The light intensity controller may control the plurality of light emitters to emit light periodically with light intensities corresponding to a predetermined chromaticity coordinates value being a reference point.

The light intensity controller may control part of the plurality of light emitters to emit light always with light intensities corresponding to a predetermined chromaticity coordinates value being a reference point.

The chromaticity coordinates calculator may map a DC-free encoded transmission signal to the chromaticity coordinates value.

The light intensity controller may control the light intensity of each of the light emitters so that a total light intensity ratio of the light emitters in one PWM period correspond to the chromaticity coordinates value corresponding to the digital value.

In another aspect of the present invention, there is provided a visible light reception apparatus for demodulating a digital value corresponding to a chromaticity coordinates value, including a plurality of light receivers having different spectral characteristics, a chromaticity coordinates calculator for calculating the chromaticity coordinates value according to a received light intensity detected by each of the light receivers, and a demodulator for demodulating the digital value from the chromaticity coordinates value.

The visible light reception apparatus may further include a chromaticity coordinates corrector for calculating a vector having elements being the received light intensities detected by the light receivers for a linear matrix for calibrating color reproduction and compensating the received light intensities detected by the light receivers.

The chromaticity coordinates corrector may calculate each coefficient of the linear matrix based on received light intensities of the light receivers detected from received light corresponding to a predetermined chromaticity coordinates value being a reference point and light intensities of the light receivers calculated from the predetermined chromaticity coordinates value being the reference point.

The chromaticity coordinates calculator may calculate the chromaticity coordinates value based on a total received light intensity detected by each of the light receivers in one PWM period.

In another aspect of the present invention, there is provided a visible light communication method in a visible light communication system having a transmission apparatus with a plurality of light emitters for emitting light in different colors and a reception apparatus with a plurality of light receivers having different spectral characteristics, including mapping a digital value to a chromaticity coordinates value by the transmission apparatus, controlling a light intensity of each of the light emitters based on the chromaticity coordinates value corresponding to the digital value by the transmission apparatus, calculating a chromaticity coordinates value according to a received light intensity detected by each of the light receivers by the reception apparatus, and demodulating the digital value from the chromaticity coordinates value by the reception apparatus.

In another aspect of the present invention, there is provided a visible light transmission apparatus with a plurality of light emitters for emitting light in different colors, including mapping a digital value to a chromaticity coordinates value, and controlling a light intensity of each of the light emitters based on the chromaticity coordinates value corresponding to the digital value.

In a further aspect of the present invention, there is provided a visible light communication method in a visible light reception apparatus having a plurality of light receivers having different spectral characteristics, for demodulating a digital value corresponding to a chromaticity coordinates value, including calculating the chromaticity coordinates value according to a received light intensity detected by each of the light receivers, and demodulating the digital value from the chromaticity coordinates value.

When the above-described configuration is applied, a digital value can be mapped to a chromaticity coordinates value, for transmission. Therefore, the multi-value transmission increases a data rate. Also, since the data transmission is not affected by light intensity attenuation on a transmission path, a high data rate is realized stably.

Advantageous Effects

According to the present invention as described above, data modulated to a multiple-value number including values more than the number of light sources can be transmitted and, at the same time, an increase in a transmission error rate caused by a decreased light intensity on a transmission path can be suppressed.

BRIEF DESCRIPTION OF THE DRAWINGS

For a more complete understanding of the present disclosure and its advantages, reference is now made to the following description taken in conjunction with the accompanying drawings, in which like reference numerals represent like parts.

BEST MODE FOR CARRYING OUT THE INVENTION

Figure 1:
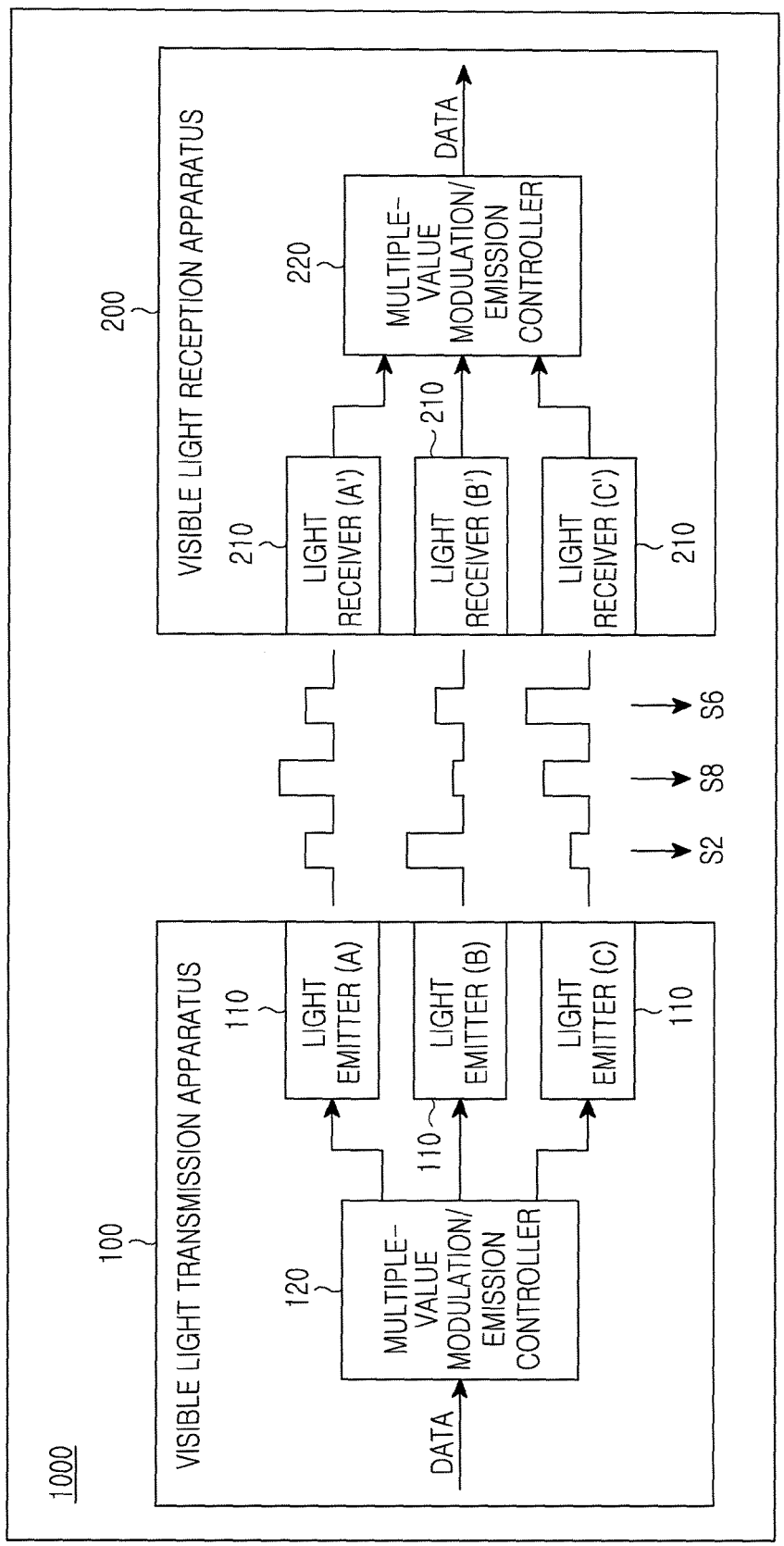
FIG. 1 illustrates a configuration of a visible light communication system according to an embodiment of the present disclosure.

Now a detailed description will be made of preferred embodiments of the present invention with reference to the attached drawings. Through the specification and drawings, the same drawing reference numerals will be understood to refer to elements having substantially the same functions and configuration, to avoid redundancy in the description.

<Embodiment of the Invention>

A visible light communication system 1000 according to an embodiment of the present invention will first be described below. The visible light communication system 1000 according to the embodiment of the present invention includes a structure for mapping a multiplexed digital value to a chromaticity coordinates value in a predetermined color system, a structure for controlling a plurality of light emitters to emit light at a chromaticity indicated by the chromaticity coordinates value, a structure for detecting the chromaticity coordinates value according to the intensity ratio of light received at each chromaticity, and a structure for demodulating an original digital value from the chromaticity coordinates. This will be described in more detail with reference to the drawings.

[Configuration of Visible Light Communication System 1000]

With reference to FIG. 1, the visible light communication system 1000 according to the embodiment of the present invention will be described. FIG. 1 illustrates the configuration of the visible light communication system 1000 according to the embodiment of the present invention.

As illustrated in FIG. 1, the visible light communication system 1000 mainly includes a visible light transmission apparatus 100 and a visible light reception apparatus 200. The visible light transmission apparatus 100 mainly includes a plurality of light emitters 110 and a multiple-value modulation/emission controller 120. Meanwhile, the visible light reception apparatus 200 mainly includes a plurality of light receivers 210 and a chromaticity detector/demodulator 220. While not shown, the visible light transmission apparatus 100 may include, for example, a serial/parallel converter for converting digital values to parallel values on a bit basis and multiplexing the parallel values. Meanwhile, the visible light reception apparatus 200 may include, for example, a parallel/serial converter for converting a plurality of bits to a serial digital value.

(Visible Light Transmission Apparatus 100)

In the visible light transmission apparatus 100, the multi-value modulation/emission controller 120 multiplexes input digital values and maps the multiplexed digital value to a chromaticity coordinates value in a predetermined color system. A plurality of chromaticity points are placed in the color system according to a modulation multiplicity. The chromaticity points correspond accurately to signal points on a constellation used in multi-value communication of a propagation area. Notably, the chromaticity coordinates of the color system are obviously different from the signal points in that the chromaticity coordinates represent colors and chromas. Accordingly, the multiplicity of a digital value may be increased by as much as chroma representations.

To emit light from the plurality of light emitters 110 at the chromaticity indicated by the chromaticity point corresponding to the multiplexed digital value, the multi-value modulation/emission controller 120 controls the light intensity of each of the light emitters 110. After setting the sum of light intensities of all the light emitters 110 to a predetermined value, the multi-value modulation/emission controller 120 may determine the light intensity ratio of each light emitter 110. That is, the multi-value modulation/emission controller 120 may apply the light intensity ratios of the light emitters 110 to the modulation signal corresponding to the multiplexed digital value. As a consequence, the problem of a decrease in a transmission error rate caused by a decrease in light intensity on a transmission path can be avoided.

(Visible Light Reception Apparatus 200)

In the visible light reception apparatus 200, the plurality of light receivers 210, which have light reception sensitivities (spectral sensitivities) to different wavelengths, receive light corresponding to the chromaticity point and measure the intensity of the received light at each wavelength (color). The chromaticity detector/demodulator 220 calculates three stimulation values from the digitally modulated light intensity of the received light at each wavelength and detects a chromaticity point using the stimulation values using a color matching function. Also, the chromaticity detector/demodulator 220 demodulates a digital value corresponding to the chromaticity coordinates value of the chromaticity point. Herein, the chromaticity detector/demodulator 220 demodulates the digital value based on the same color system as used in the multi-value modulation/emission controller 120. It is assumed that the chromaticity detector/demodulator 220 already has information about the positions of color points placed in the predetermined color system.

Figure 2:
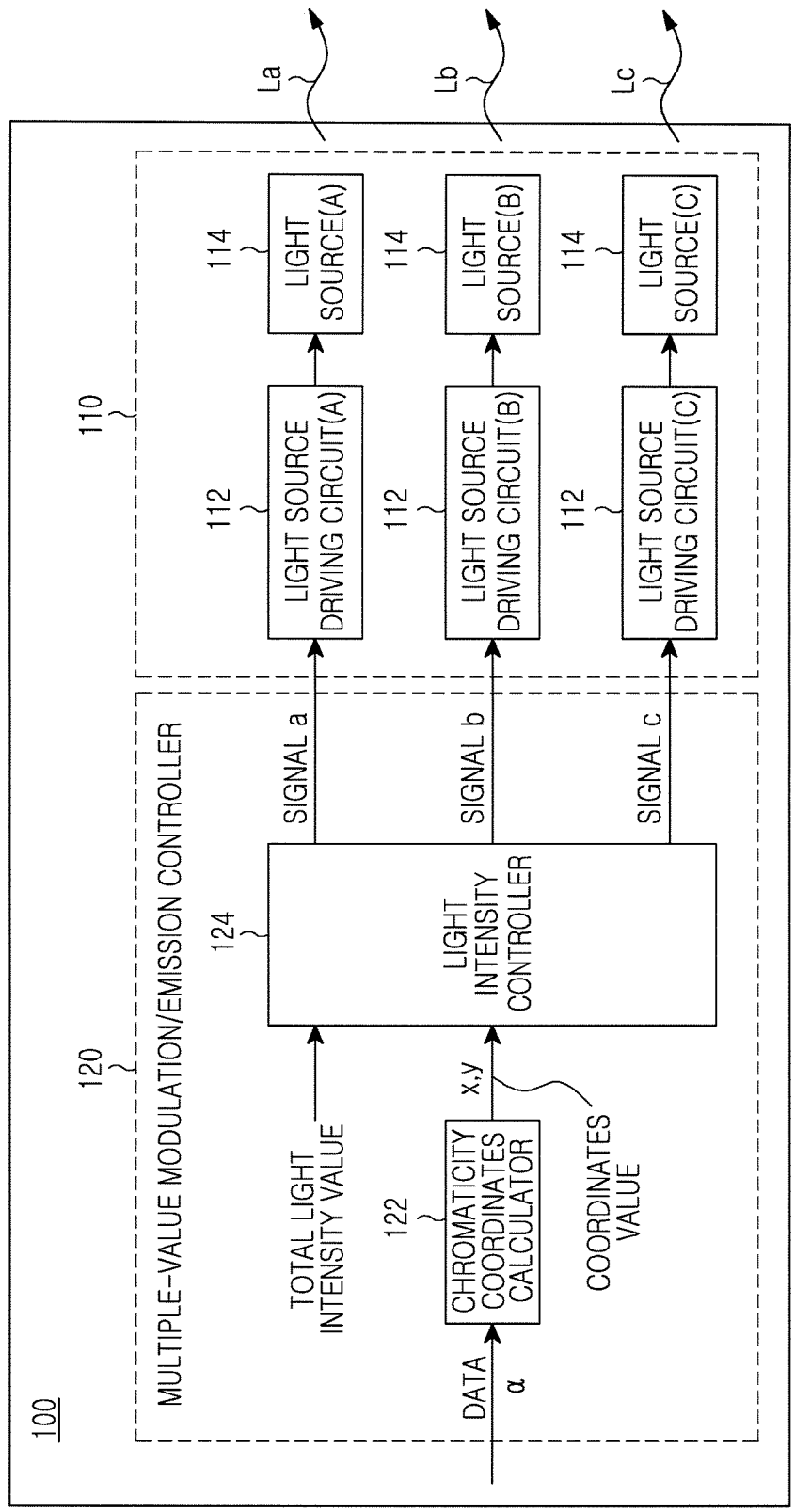
FIG. 2 illustrates a functional structure of a visible light transmission apparatus according to an embodiment of the present disclosure.
Figure 3:
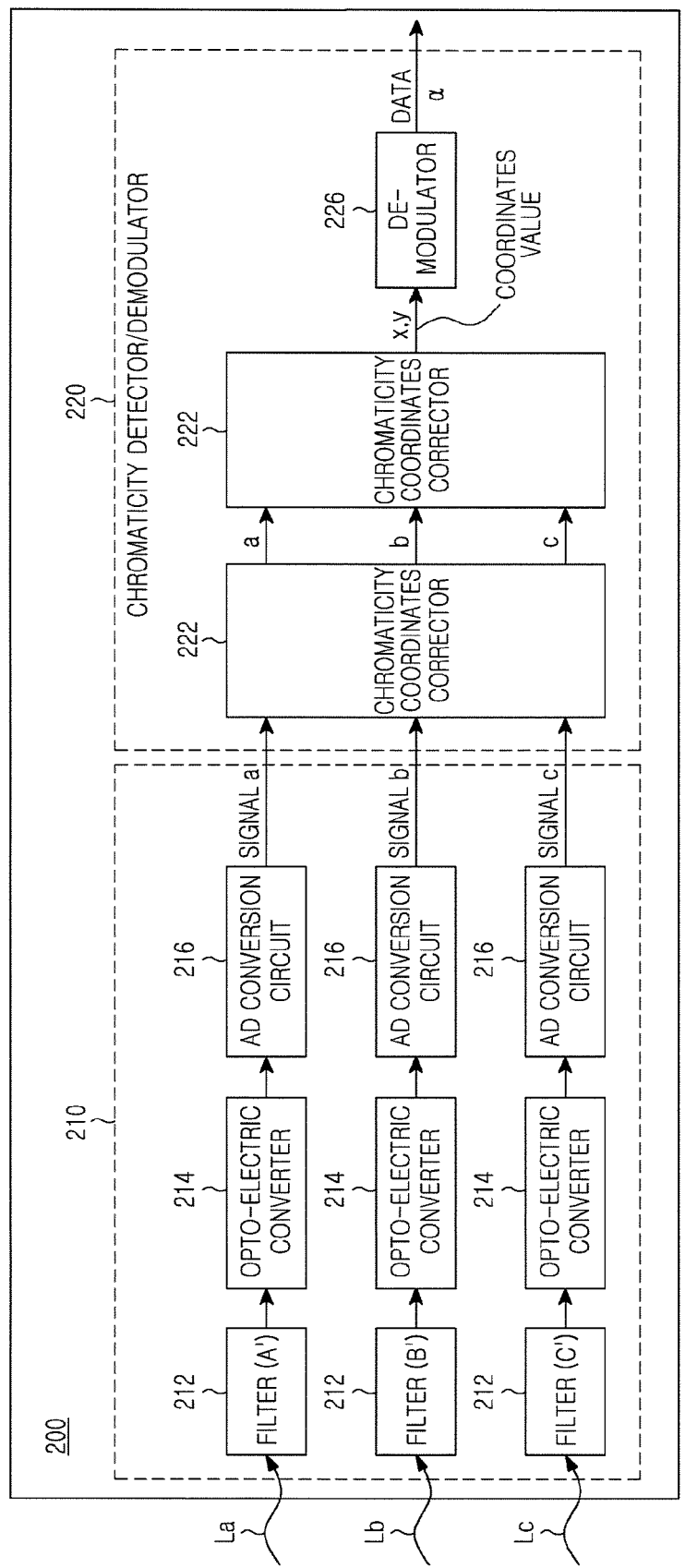
FIG. 3 illustrates a functional configuration of the visible light reception apparatus according to an embodiment of the present disclosure.

The configuration of the visible light communication system 1000 has been described in brief. According to the configuration, for example, as illustrated in FIG. 1, information about a chromaticity point corresponding to multi-value signals S2, S8 and S6 can be transmitted at the ratios of the intensities of light emitted from the light emitters 110. As a result, the multiplicity may be increased to or above the number of the light emitters 110 and the problem of a decrease in a transmission error rate caused by a decrease in light intensity on a transmission path may be avoided. With reference to FIGS. 2 and 3, functional structures of the visible light transmission apparatus 100 and the visible light reception apparatus 200 will be described below in detail.

[Functional Structure of Visible Light Transmission Apparatus 100]

Referring to FIG. 2, a functional structure of the visible light transmission apparatus 100 according to the embodiment of the present invention will be described. FIG. 2 illustrates the functional structure of the visible light transmission apparatus 100 according to the embodiment of the present invention.

As illustrated in FIG. 2, the visible light transmission apparatus 100 mainly includes a chromaticity coordinates calculator 122, a light intensity controller 124, light source driving circuits 112, and light sources 114. The chromaticity coordinates calculator 122 and the light intensity controller 124 form the multi-value modulation/emission controller 120. The light source driving circuits 122 and the light sources 114 form the light emitters 110. While not shown, the visible light transmission apparatus 100 may further include the serial/parallel converter.

(Chromaticity Coordinate Calculator 122)

The chromaticity coordinate calculator 122 maps a received digital value a to a chromaticity point. That is, the chromaticity coordinate calculator 122 maps each digital value to the chromaticity coordinates value of a chromaticity point corresponding to the digital value according to a layout of chromaticity points having predetermined multiple-value numbers. The chromaticity coordinate calculator 122 may use any of color systems including, for example, a Munsell color system and an Ostwald color system as well as a CIE color system (RGB, XYZ(Yxy), LxUxV, Lxaxb, etc) adopted by the Commission Internationale de l'Eclairage (CIE), as the color system having chromaticity points. This is because the visible light communication system 1000 according to the embodiment of the present invention can perform chromaticity detection by a scheme such as spectrophotometric colorimetry, as described later.

Figure 4:
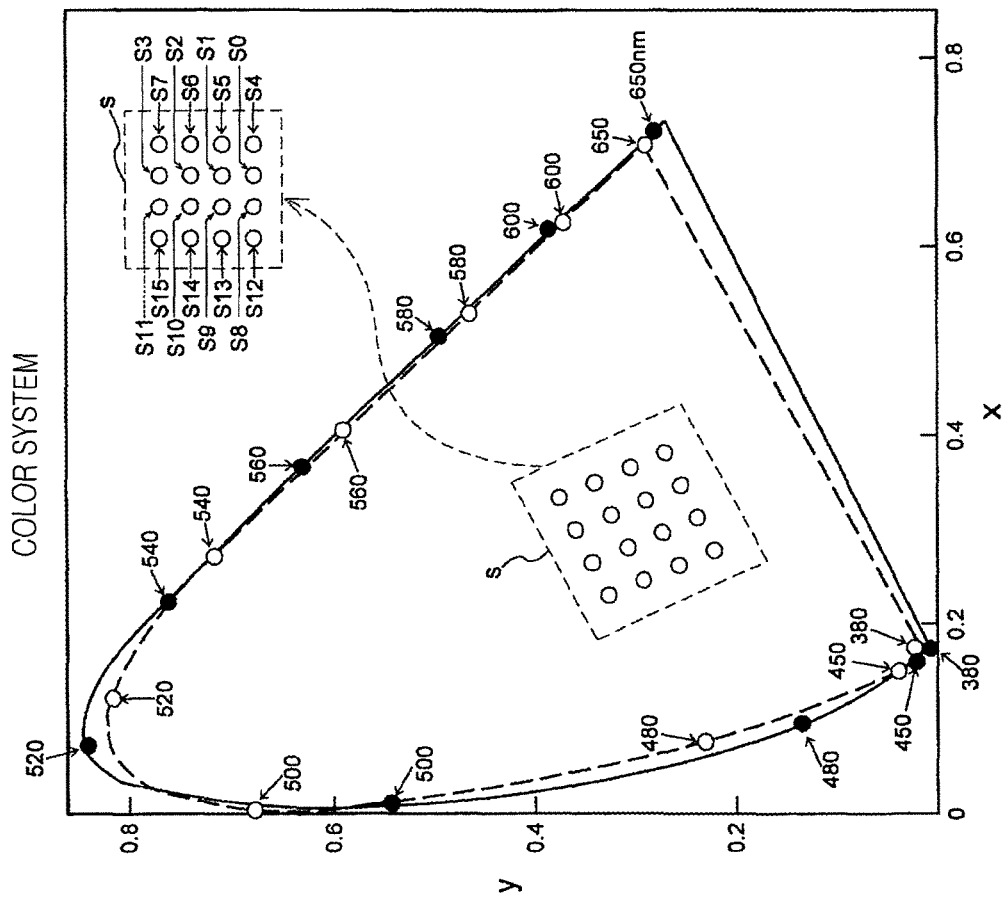
FIG. 4A is a diagram illustrating a predetermined chromaticity point layout defined in a Yxy color system according to an embodiment of the present disclosure.
FIG. 4B illustrates a table including information about the chromaticity point layout of the color system illustrated in FIG. 4A according to an embodiment of the present disclosure.

With reference to FIG. 4, a specific function of the chromaticity coordinate calculator 122 will be described in brief. FIG. 4 is a diagram illustrating a predetermined chromaticity point layout defined in a Yxy color system. In FIG. 4, a 2-degree visual field (a solid line) and a 10-degree visual field (a dotted line) are illustrated.

As illustrated in FIG. 4, for example, a predetermined chromaticity point layout s is preliminarily set in the color system. Information about the type of the color system and the chromaticity point layout is shared between the visible light transmission apparatus 100 and the visible light reception apparatus 200 in advance, or notified by a predetermined method during data transmission. In the example of FIG. 4, the chromaticity point layout s is for the case of 4-bit multiplexing of digital values (modulation multiplicity=16). Chromaticity points S0 to S15 are mapped to, for example, digital values illustrated in FIG. 4(B). The chromaticity coordinate calculator 122 selects a chromaticity point corresponding to the input digital value a from among the chromaticity points S0 to S15 and determines the chromaticity coordinates value (x, y) of the selected chromaticity point.

For example, if the digital value α=0×7, the chromaticity coordinate calculator 122 selects the chromaticity point S7 and transmits the chromaticity coordinates value (x, y) of the chromaticity point to the light intensity controller 124. As noted from the above example, as the multiplicity is expressed as $2^M$ (M is an integer), data transmission can be carried out by mapping an M-bit digital value to one chromaticity point. Also, information about the chromaticity point layout of the color system illustrated in FIG. 4(A) may be tabulated as illustrated in FIG. 4(B) and shared between the visible light transmission apparatus 100 and the visible light reception apparatus 200.

(Light Intensity Controller 124)

FIG. 2 will be referred to again. The light intensity controller 124 determines the light intensities of the light emitters 110 at respective wavelengths of light to emit light with the chromaticity indicated by the chromaticity coordinates value (x, y) determined by the chromaticity coordinate calculator 122. Especially, the light intensity controller 124 calculates a light intensity ratio for each wavelength to realize the chromaticity corresponding to the chromaticity coordinates value (x, y). For example, the light intensity controller 124 calculates a mixing ratio of Red (R), Green (G) and Blue (B) to realize the chromaticity corresponding to the chromaticity coordinates value (x, y) and calculates driving voltages for the light emitters 110 according to the light intensities of the colors.

The light intensity controller 124 also determines the light intensity of each color so that the total light intensity of the light emitters 110 is a predetermined value and calculates a driving voltage corresponding to the light intensity of each color. This is because considering that chromaticity coordinate values are usually standardized as luminances, it is preferable to control the light intensities of the light emitters 110 according to the total light intensity. The light intensity controller 124 transmits a driving circuit control signal to each light source driving circuit 112 in order to emit light from each light source 114 at the driving voltage calculated for each color, as described later. The driving circuit control signal is used to control the light intensity of each light source 114. In the example of FIG. 2, the light intensity controller 124 transmits three driving circuit control signals a, b and c to light source driving circuits (A), (B) and (C), respectively.

Also, the light intensity controller 124 may represent a chromaticity by controlling the total light intensity of the light sources 114 for a predetermined time. That is, the light intensity controller 124 multiplies the intensity of light that each light source 114 emits for a predetermined time, for each color and calculates a chromaticity coordinates value using the product value of each color as the received light intensity of each color. Then the light intensity controller 124 determines the driving voltage of each light source 114 as represented by the chromaticity coordinates value (x, y). For instance, if the visible light transmission apparatus 100 is a lighting device that performs PWM control, the influence of the PWM control may be eliminated by mapping an accumulated light intensity value to a chromaticity coordinates value (x, y) according to a PWM period.

Further, the light intensity controller 124 controls the light intensity of each light source 114 according to a chromaticity corresponding to a predetermined chromaticity coordinates point (hereinafter, referred to as a reference point or a predetermined pattern) during initialization or periodically. As described later, the visible light reception apparatus 200 uses a linear matrix that calibrates the difference between the light emission spectrum of the transmitting side and the spectral sensitivity of the receiving side, for calibration of color reproduction. Accordingly, the visible light transmission apparatus 100 may transmit the reference signal for calibration of a linear matrix value by emitting light with a chromaticity corresponding to the reference point at a predetermined timing or periodically in order to cope with a change in the light emission spectrum of the transmitting side or a change in the spectral sensitivity of the receiving side.

(Light Source Driving Circuits 112)

The light source circuits 112 control the light intensities of the later-described light sources 114 according to the driving circuit control signals received from the emission controller 124. For example, a light source (A) driving circuit 112 connected to the light source (A) 114 receives the driving circuit control signal a and drives the light source (A) 114 to emit light at a driving voltage indicated by the driving circuit control signal a. Similarly, a light source (B) driving circuit 112 and a light source (C) driving circuit 112 also drive the light source (B) 114 and the light source (C) 114 according to the driving circuit control signals b and c, respectively.

(Light Sources 114)

The light sources 114 emit light according to the driving voltages supplied from the light source driving circuits 112. Although the light sources 114 are configured with semiconductor light emitting devices such as LEDs, LDs or SLDs, they may be configured with light emitting devices included in fluorescent lights, CRT displays, Plasma Display Panel (PDP) devices, Electro Luminescence (EL) displays, or LCDs.

As described later in detail, the visible light communication system 100 according to the embodiment of the present invention transmits data by mapping a digital value to chromaticity coordinates. The data transmission is different from data transmission based on wavelength modulation or the like and is performed to avoid influence on the spectral distribution of the light sources 114. For example, when the spectrum of white light emitted from the light sources 114 using LEDs is detected, peaks appear at the wavelengths of R, G and B. However, the spectrum of white light emitted by display devices described above has small peaks at the wavelengths of R, G and B and the spectrum is wide. If a structure for detecting a signal based on a spectrum shape or a signal strength is used, a difference from the spectrum shape is represented as a difference from demodulated data. Therefore, the type of a device used as a light source needs to be limited. In contrast, if data is transmitted using chromaticity coordinates as in the embodiment of the present invention, the signal may be received using the visible light reception apparatus 200 irrespective of the type of the light sources 114. As a result, light sources 114 having a variety of light emitting devices can be handled.

As illustrated in FIG. 4, the visible light transmission apparatus 100 has a plurality of light sources 114. The light sources 114 have their unique spectral distributions and may emit lights of different colors (La, Lb and Lc). Also, each light source 114 is not confined to a single-mode oscillator.

It may be possible to group the plurality of light resources 114 into a plurality of groups each for emitting light of the same color and to control light intensity on a group basis. In this case, for example, the light source driving circuits 112 are configured so as to supply driving voltages to the light sources 114 on a group basis or the light intensity controller 124 is configured so as to transmit the same driving circuit control signal to light source driving circuits 112 connected to the same group of light sources 114. Alternatively, the chromaticity of light may be adjusted by controlling the number of light emissions of the light sources 114 in each group through on/off control of all or part of the light sources 114 in the group.

The functional configuration of the visible light transmission apparatus 100 according to the embodiment of the present invention has been described so far. If the functional configuration is applied, the chromaticity coordinates-based data transmission enables modulation of data to a multi-value number having as many values as or values more than the number of the light sources 114 in the visible light transmission apparatus 100, increases the amount of data transmittable in one pulse, and achieves higher-rate data transmission. Also, as information is carried at the light intensity ratio of each color, the resulting little influence of light intensity attenuation on the transmission path may lead to a decreased transmission error rate. Since data transmission is based on chromaticities, it is possible to achieve high speed by increasing the number of multiple values by the number of chromas included in the chromatcities and the type of the light sources 114 is not selected.

(Functional Configuration of Visible Light Reception Apparatus 200)

With reference to FIG. 3, a functional configuration of the visible light reception apparatus 200 according to the embodiment of the present invention will be described. FIG. 3 illustrates the functional configuration of the visible light reception apparatus 200 according to the embodiment of the present invention.

As illustrated in FIG. 3, the visible light reception apparatus 200 mainly includes filters 212, opto-electric converters 214, AD conversion circuits 216, a chromaticity coordinates corrector 222, a chromaticity coordinates value detector 224, and a demodulator 226. The filters 212, the opto-electric converters 214, and AD conversion circuits 216 form the light receivers 210. The chromaticity coordinates corrector 222, the chromaticity coordinates value detector 224, and the demodulator 226 form the chromaticity detector/demodulator 220.

(Filters 212 and Opto-Electric Converters 214)

The filters 212 are optical filters having predetermined spectral sensitivity characteristics. To be more specific, the filters 212 are color filters for separating light of each color. When light is incident through the filters 212, the opto-electric converters 214 output power according to their received light intensities. Hence, the received light intensity of each color may be detected by combining the filters 212 and the opto-electric converters 214.

The opto-electric converters 214 are configured with, for example, Photo Diodes (PDs) (pn-type PDs, pin-type PDs, or Avalanche Photo Diodes (APDs)) and output currents of amounts proportional to the received light intensities. Thus, the opto-electric converters 214 may output signals according to the magnitudes of the output currents. Meanwhile, since color reproduction is calibrated using a linear matrix at a rear end in the visible light communication system 1000 according to the embodiment of the present invention, a chromaticity coordinates value can be detected even though the spectral sensitivity of the visible light reception apparatus 200 does not perfectly match to the spectral distribution of the visible light transmission apparatus 100.

(AD Conversion Circuits 216)

The AD conversion circuits 216 are A/D converters for converting analog signals to digital signals. The A/D conversion circuits 216 convert signals of respective colors (analog signals) received from the opto-electric converters 214 to digital signals. For instance, in the example of FIG. 3, light incident on an opto-electric converter 214 through a filter (A') 212 is converted to an analog electric signal by opto-electric conversion, converted to a digital signal a' by an AD conversion circuit 216, and then provided to the chromaticity coordinates corrector 222. In the same manner, digital signals b' and c' corresponding to light incident through a filter (B') 212 and a filter (C') 212 are provided to the chromaticity coordinates corrector 222.

(Chromaticity Coordinate Corrector 222)

The chromaticity coordinates corrector 222 calibrates color reproduction using a linear matrix scheme. The linear matrix scheme will be described briefly.

A color calibration technology called a linear matrix scheme is used to calibrate color reproduction in a photographing device such as a digital camera or a video camera. This photographing device functions to determine components of a linear matrix by comparing the color reproduction of sample images (predetermined color patterns, etc.) captured under a predetermined condition (e.g. a constant lighting condition, etc.) with the color reproduction of sample images captured under an actual condition. Specifically, the photographing device captures a sample image and determines matrix components that convert the RGB data (a received light intensity measured for each color) of the actually captured sample image to the RGB data of a preserved sample image.

For an image other than the sample image, a linear matrix is applied to captured RGB data and the RGB data is converted to RGB data with no change in filter characteristics or received light sensitivity characteristics. Consequently, despite a change in filter characteristics or received light sensitivity characteristics, a linear matrix can be calibrated by use of a predetermined sample image. Therefore, an output result based on constant filter characteristics or received light sensitivity characteristics can be achieved.

As described above, when multiplexed data is optically transmitted using color coordinates, a decrease in the spectral sensitivity of the receiving side leads to an increase in a demodulation error rate, compared to a general wavelength multiplexing scheme in which light with a separated emission spectrum is received and demodulated. Moreover, since the spectral sensitivity of the receiving side is dependent on the spectral sensitivity of the opto-electric converters 214 and the color separation filters 212, for example, a change in the spectral sensitivities affects color reproduction.

In this context, the linear matrix scheme used for a video camera or a digital video camera is adopted. According to the linear matrix scheme, reproduction-calibrated light intensities R', G' and B' of the respective colors are calculated by operating a predetermined matrix (a linear matrix) with the received light intensities of colors R, G and B, as by equation (1). For a video camera or the like, the linear matrix scheme is used to make color reproduction approximate to an ideal color reproduction defined as a standard of a video signal.

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (1)$$

The elements of the matrix, $a_{11}$-$a_{33}$ are coefficients determined according to the spectral sensitivities of the filters 212, the opto-electric converters 214, etc. Each coefficient of the linear matrix may be calculated using at least three sets of data with respect to the light intensities (R, G, B) and the post-calibration light intensities (R', G', B'). Thus, the visible light transmission apparatus 100 mixes a transmission signal with a reference signal corresponding to a predetermined chromaticity coordinates value (a reference point) and transmits the mixed signal periodically or at a predetermined timing. The visible light reception apparatus 200 may calculate each coefficient of the linear matrix at the chromaticity coordinates corrector 222 after receiving the reference signal through the light receivers 210. Obviously, values of post-calibration received light intensities (R', G' and B') corresponding to the reference point are preserved in advance in the chromaticity coordinates corrector 222. Also, the chromaticity coordinates corrector 222 may calculate each coefficient of the linear matrix using three or more sets of data by a least square method. According to the least square method, more reliable coefficients may be calculated.

The chromaticity coordinates corrector 222 calculates equation (1) using the linear matrix acquired by the above method. That is, the chromaticity coordinates corrector 222 calibrates color reproduction so that the color coordinates of the transmitting side are identical to those of the receiving side. Consequently, the color coordinates of both the transmitting and receiving sides can be rendered identical through linear matrix conversion, even though the emission spectrum distribution of the visible light transmission apparatus 100 does not perfectly match to the spectral sensitivity of the visible light reception apparatus 200. For example, even though the color combination of the light sources 114 in the visible light transmission apparatus 100 is changed, a digital value corresponding to a chromaticity point can be decoded because the spacing between the chromaticity points S0 to S5 and their relative position relationship are known.

When there is light incident on the light receivers 210 of the visible light reception apparatus 200 from a device other than the visible light transmission apparatus 100, an addition term is added during converting the light intensities (R, G and B) to the post-calibration light intensities (R', G' and B'). Thus, the chromaticity coordinates corrector 222 calculates the following equation (2).

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} + \begin{pmatrix} R_0 \\ G_0 \\ B_0 \end{pmatrix} \quad (2)$$

The chromaticity coordinates corrector 222 compensates digital signals a', b' and c' corresponding to the received light intensities of the respective colors by calculating equation (1) or equation (2) and provides the resulting compensated digital signals a, b and c to the chromaticity coordinates value detector 224.

(Chromaticity Coordinates Value Detector 224)

The chromaticity coordinates value detector 224 detects a chromaticity coordinates value (x, y) based on the digital signals a, b, and c compensated by the chromaticity coordinates corrector 222. Herein, the chromaticity coordinates value detector 224 detects the chromaticity coordinates value (x, y) based on the color system used in the chromaticity coordinate calculator 122 of the visible light transmission apparatus 100. For example, in case of the Yxy color system illustrated in FIG. 4, the chromaticity coordinates value detector 224 calculates three stimulation values (X, Y, Z) from the digital signals (a, b, c) using a color matching function representing a spectral sensitivity corresponding to the human eye and derives the chromaticity coordinates value (x, y) from the calculation result. Meanwhile, the chromaticity coordinates value (x, y) may be derived from the digital signals (a, b, c) as done in spectrophotometric colorimetry. The chromaticity coordinates value detector 224 transmits the derived chromaticity coordinates value (x, y) to the demodulator 226.

In the case where the light intensity controller 124 of the visible light transmission apparatus 100 drives the light sources 114, taking into account PWM control, a signal is transmitted according to a PWM period. Therefore, the chromaticity coordinates value detector 224 multiplies the digital signals (a, b, c) for the respective colors in one PWM period or over a predetermined time period and derives the chromaticity coordinates value (x, y) according to the resulting products (A, B, C).

In a general lighting device, a light intensity perceivable to a human being can be adjusted by prolonging or shortening a light emission time through light intensity control by PWM driving of a light source. According to the above configuration, since the chromaticity coordinates value (x, y) is measured using the light intensity multiplied over at least one PWM period, there is little influence of the PWM control. One thing to note here is that PWM periods should be synchronized among the light sources 114.

(Demodulator 226)

The demodulator 226 demodulates the original digital value a based on the chromaticity coordinates value (x, y). The demodulator 226 may detect the digital value a corresponding to a chromaticity point at the chromaticity coordinates value (x, y) in the chromaticity point layout (refer to FIG. 4) of the color system used in the chromaticity coordinates calculator 122. Notably, it is assumed that the demodulator 226 preserves information about the chromaticity point layout.

The functional configuration of the visible light reception apparatus 200 according to the embodiment of the present invention has been described above. According to the configuration, the chromaticity coordinates value corresponding to the received light intensities of the respective colors is calculated and the original digital value a is demodulated based on the chromaticity coordinates value (x, y). Therefore, an increase in a transmission error rate caused by attenuation of light intensity on a transmission path can be suppressed. Also, since color reproduction is calibrated using the linear matrix scheme, the original digital value a can be demodulated even though the emission spectrum of the transmitting side does not perfectly matches the light reception sensitivity of the receiving side. Now a detailed description will be made of effects that can be achieved from applying the visible light communication system 1000 according to the embodiment of the present invention.

[Effects of the Embodiment]

Effects that can be achieved by applying the configuration of the visible light communication system 1000 according to the embodiment of the present invention will be described in detail. First, a visible light communication technology is investigated from a different viewpoint from the embodiment of the present invention and then effects of the embodiment of the present invention will be described in contrast.

(Consideration 1)

A structure for carrying out visible light communication by on/off control of three types of (R, G, B) light sources will be investigated. For example, in a structure for independent on/off control of a light source R, a light source G, and a light source B, 1-bit data can be transmitted by each of R, G and B and thus 3-bit data can be transmitted by their combination. While octal numbers may be mapped to RGB combinations, for transmission, the transmission rate of data may not be increased because the number of bits of data transmittable at one time is less than that of light sources. In this context, the visible light communication system 1000 according to the embodiment of the present invention may offer special effects in that multiplexing of as many data as or data more than the number of light sources is possible, compared to the simple RGB on/off structure, because multiplexed digital values are mapped to multiple-value chromaticity points at chromaticity coordinates.

(Consideration 2)

A structure for mapping data to the absolute values of the intensities of light emitted from three types of (R, G, B) light sources and transmitting the absolute values will be considered. For example, a structure for emitting light from light sources by controlling their light intensities in the transmitting side, and measuring the absolute values of received light intensities of R, G, and B and demodulating data corresponding to the received light intensities in the receiving side may be considered. This structure increases an error rate during demodulation as light intensity attenuates on a transmission path. Particularly, when the structure is applied to a lighting device or the like, the light intensity is readily attenuated due to the influence of shielding, etc. As a result, it is difficult to increase a data rate. In this respect, the visible light communication system 1000 according to the embodiment of the present invention offers special effects in that a change in light intensity seldom affects an error rate during demodulation because a digital value is mapped to a chromaticity coordinates value, for transmission and thus the chromaticity coordinates value is detected according to a ratio (a relative value) of the received light intensity measured for each color, even though the light intensity is changed on the transmission path.

(Consideration 3)

Now a structure for mapping a digital value to a chrominance, for transmission may be considered. A chrominance may be expressed as an angle of a color circle. For example, a structure for defining data 1 as light emission in color corresponding to 10-degree clockwise movement of the color circle from red at the next timing after light emission in color at the position of red may be contemplated. With the use of chrominance, the attenuation of light intensity on a transmission path does not affect a transmission error rate much as in the embodiment of the present invention. However, if data 1 is mapped to the chrominance resulting from the 10-degree clockwise movement, successive transmission of data 1 changes color significantly in a particular direction. Hence, the color of a lighting device changes considerably and the types of available lighting devices are limited. Moreover, when data is mapped to a small chrominance, a signal identification level drops and thus a transmission error rate during demodulation is increased. Consequently, a data rate is decreased. In this respect, the visible light communication system 1000 according to the embodiment of the present invention offers the special effects that successive transmission data are not followed, multiplexing using a predetermined color range is possible, and the colors of lighting devices are not changed much (the type and usage of a light source are not selected) because a digital value is modulated to a multiple-value number according to the chromaticity point layout of a color system. Compared to modulation to a chrominance, since as much multi-value modulation as chromas included in chromaticities is enabled, higher-rate data transmission is possible.

As described above, the visible light communication system 1000 according to the embodiment of the present invention achieves the foregoing effects in view of the basic characteristic of mapping digital values to color coordinates, for transmission. However, the effects that the visible light communication system 1000 can achieve are not limited to the foregoing effects.

For example, an LCD or PDP that has a wider 3-color (R, G, B) light emission spectrum than an LED can be used as a light source. The chromaticity coordinates define color matching function-based responses, rather than they correspond to the spectrum of light. Therefore, the same chromaticity coordinates may result, despite different spectrums. For instance, white of a fluorescent light with a wide light emission spectrum and white having a strong peak in R, G, B (e.g. 623 nm, 523 nm, and 456 nm) expressed as R, G, B of an LED are at the same chromaticity coordinates. Therefore, compared to a structure for identifying a signal by the shape of a spectrum, a special effect is achieved in that signal identification is possible irrespective of the spectral distribution of a light source.

In another example, there is the effect of obviating the need for using three primary R, G, B colors. Since the receiving side has only to detect the chromaticity coordinates value of a chromaticity point, if the spacing between chromaticity points is set to be larger than noise, data can be transmitted even by light other than white light. For example, multiplexing is possible using blue (B) and green (G) light sources only.

In a further example, even though the colors of the light sources of the visible light transmission apparatus 100 are changed, data transmission is possible without changing the configuration of the visible light reception apparatus 200. This is based on a structure for transmitting a predetermined pattern at a chromaticity corresponding to a reference point and calibrating a linear matrix using the predetermined pattern. With the use of the structure for calibrating the linear matrix using the reference signal transmitted at a predetermined timing or periodically, the chromaticity coordinates of the transmitting side can be matched to those of the receiving side based on the spacing between chromaticity points and the relative position relationship of the chromaticity points. Therefore, it is possible to detect a chromaticity coordinates point according to the received light intensity of each color that is converted by the linear matrix.

Further, in still another example, since a clock signal may be generated from transmitted data, many transmission rates may be handled.

So far, the effects of the visible light communication system 1000 according to the embodiment of the present invention have been described in detail. As stated before, only a relatively low-rate modulation is achieved in a typical lighting LED or the like. Hence, it is important to increase a data rate in optical communications based on the relatively low-rate modulation. In that aspect, the use of the above-described configuration enables high-speed data transmission using a lighting device with a low modulation speed. In the mean time, the upper limit of multiplexing is determined according to the distance between chromaticities, noise, a mismatch width in light reception sensitivity, and an error correction capability, which also determine the upper limit of a data rate in the above configuration.

While the preferred embodiment of the present invention has been described with reference to the attached drawings, it is obvious that the present invention is not limited to related examples. Those skilled in the art will understand that various modifications or changes can be made within the spirit scope of the present invention as defined by the appended claims and their equivalents and they also fall into the technical scope of the present invention.

For example, while transmission paths have not been addressed in the above description of the embodiment of the present invention, the technology according to the embodiment of the present invention is applicable to an optical fiber transmission line as well as a wireless transmission line. Especially, it is possible to realize high-speed fiber optic communication using a multiplexed signal due to strong robustness against light intensity attenuation on a transmission path.

Figure 5:
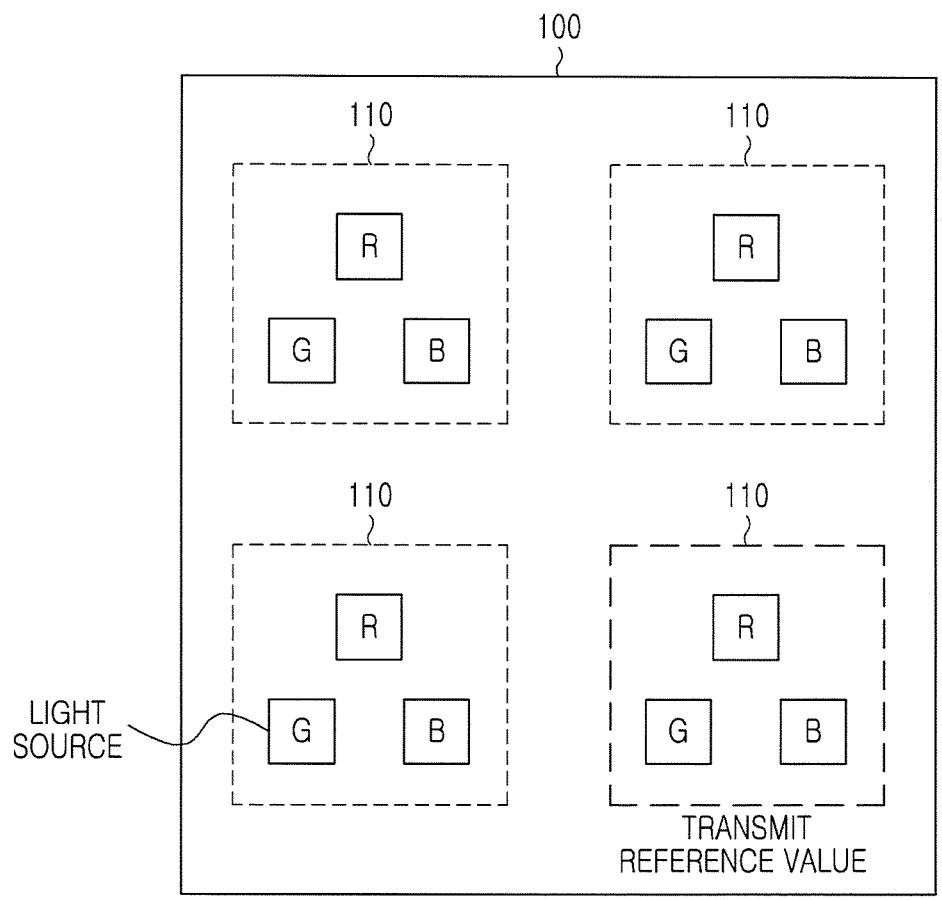
FIG. 5 illustrates a structure for transmitting a reference signal from some light source group that enables calibration of a linear matrix using a signal corresponding to a reference point according to an embodiment of the present disclosure.

While a structure for spatially multiplexing a plurality of light sources is not described in the description of the embodiment of the present invention, it is possible to place a plurality of light source groups of the same configuration spatially (two-dimensionally), for multiplexing. In this case, data can be transmitted at as high a speed as spatial multiplexing. Also, as illustrated in FIG. 5, a structure for transmitting a reference signal from some light source group always enables calibration of a linear matrix using a signal corresponding to a reference point. Thus, even when light is incident from other light sources, the original state may be recovered fast. When this structure is employed, it may be set whether to perform the linear matrix calibration always or at a predetermined timing in the receiving side.

While the received light intensity of each color is measured using a plurality of light receivers with different spectral characteristics at different colors in the description of the embodiment of the present invention, the spectrum decomposition of light may be carried out by using one spectral sensor or one detector, and one spectrum analyzer in combination. Also, the transmitting side may be configured so as to use a DC-free coded signal and make the DC-free signal appear as a single illuminated light to the human eye. Herein, the DC-free code is a code including the same number of 1s and 0s.

The invention claimed is:

1. A transmission apparatus, the transmission apparatus comprising:
    a plurality of light emitters configured to emit light in different colors; and
    a controller configured to:
        transform data into a coordinate value in color coordinates according to a mapping rule,
        determine a light intensity ratio of each of the plurality of light emitters based on transformed coordinate value and coordinate values of the plurality of light emitters, and
        control light intensity of each of the plurality of light emitters based on the determined light intensity ratio.

2. The transmission apparatus of claim 1, wherein the mapping rule comprises a table defining a relationship between a plurality of digital values regarding data and a plurality of coordinate values.

3. The transmission apparatus of claim 2, wherein a number of the plurality of digital values and a number of the plurality of coordinate values is 16.

4. The transmission apparatus of claim 1, wherein a sum of the determined light intensity ratio of each of the plurality of light emitters is set as a predetermined value.

5. A reception apparatus comprising:
    a plurality of light receivers; and
    a controller configured to:
        generate a coordinate value in color coordinates according to a ratio of received light intensity detected by each of the plurality of light receivers, and
        decode the coordinate value into a digital value of data based on a mapping rule.

6. The reception apparatus of claim 5, wherein the mapping rule comprises a table defining a relationship between a plurality of digital values regarding data and a plurality of coordinate values.

7. The reception apparatus of claim 6, wherein a number of the plurality of digital values and a number of the plurality of coordinate values is 16.

8. The reception apparatus of claim 7, wherein a sum of the ratio of received light intensity detected by each of the light receivers is set as a predetermined value.

9. The reception apparatus of claim 6, wherein the plurality of light receivers have different spectral characteristics.

10. An operating method of a transmission apparatus comprising a plurality of light emitters configured to emit light in different colors, the method comprising:
    transforming data into a coordinate value in color coordinates according to a mapping rule,
    determining a light intensity ratio of each of the plurality of light emitters based on transformed coordinate value and coordinate values of the plurality of light emitters, and
    emitting light by each of the plurality of light emitters based on the determined light intensity ratio.

11. The method of claim 10, wherein the mapping rule comprises a table defining a relationship between a plurality of digital values regarding data and a plurality of coordinate values.

12. The method of claim 11, wherein a number of the plurality of digital values and a number of the plurality of coordinate values is 16.

13. The method of claim 10, wherein a sum of the determined light intensity ratio of each of the plurality of light emitters is set as a predetermined value.

14. An operating method of a reception apparatus comprising a plurality of light receivers, the method comprising:
    receiving light at each of the plurality of light receivers;
    generating a coordinate value in color coordinates according to a ratio of received light intensity detected by each of the plurality of light receivers; and
    decoding the coordinate value into a digital value of data based on a mapping rule.

15. The method of claim 14, wherein the mapping rule comprises a table defining a relationship between a plurality of digital values regarding data and a plurality of coordinate values.

16. The method of claim 15, wherein a number of the plurality of digital values and a number of the plurality of coordinate values is 16.

17. The method of claim 14, wherein a sum of the ratio of received light intensity detected by each of the light receivers is set as a predetermined value.

18. The method of claim 14, wherein the plurality of light receivers have different spectral characteristics.

* * * * *